United States Patent [19]

Matsuda

[11] Patent Number: 5,973,792
[45] Date of Patent: Oct. 26, 1999

[54] IMAGE PROCESSING APPARATUS THAT CAN READ OUT IMAGE OF ORIGINAL WITH FIDELITY

[75] Inventor: Shinya Matsuda, Kyoto, Japan

[73] Assignee: Minolta Co., Ltd., Osaka, Japan

[21] Appl. No.: 08/786,836

[22] Filed: Jan. 22, 1997

[30] Foreign Application Priority Data

Jan. 26, 1996 [JP] Japan .................................. 8-011615

[51] Int. Cl.$^6$ ................................................ H04N 1/40
[52] U.S. Cl. ........................................ 358/448; 358/464
[58] Field of Search .................................. 358/488, 474, 358/448, 463, 447, 464; 355/23, 24, 25; 399/362, 363, 364

[56] References Cited

U.S. PATENT DOCUMENTS

| 5,084,611 | 1/1992 | Okisu et al. | 250/208 |
| 5,119,211 | 6/1992 | Sakurai | 358/464 |
| 5,416,609 | 5/1995 | Matsuda et al. | 358/474 |
| 5,646,744 | 7/1997 | Knox | 358/401 |

FOREIGN PATENT DOCUMENTS 7-87295  3/1995  Japan .

*Primary Examiner*—Thomas D. Lee
*Attorney, Agent, or Firm*—McDermott, Will & Emery

[57] ABSTRACT

In reading out an original of a state where a plurality of sheet faces are superimposed, image data is obtained by respectively scanning a first sheet face, a second sheet face which is the back side of the first sheet face, and a third sheet face which is a third face when the first sheet face is the first face. According to the read out image data, an opposite side transmittance rate representing degree of image transmittance on a first face which is the face of interest to be read out by an image of a second face which is the back side of the first face, and a trace transmittance rate representing degree of image transmittance on the first face by an image of a third face located facing the second face are obtained. Using respective calculated values of the opposite side transmittance rate and the trace transmittance rate, an unrequired image component in read out image data with an arbitrary sheet face as the first face is quantitated and subtracted from the read out image data. As a result, a read out image is obtained that is in fidelity to the image of the face of interest for read out even at the occurrence of not only opposite side transmittance, but also trace transmittance.

11 Claims, 13 Drawing Sheets

BOUND IN WESTERN STYLE

LEFTWARD ADVANCE

BOUND IN JAPANESE STYLE

RIGHTWARD ADVANCE

Fig.12
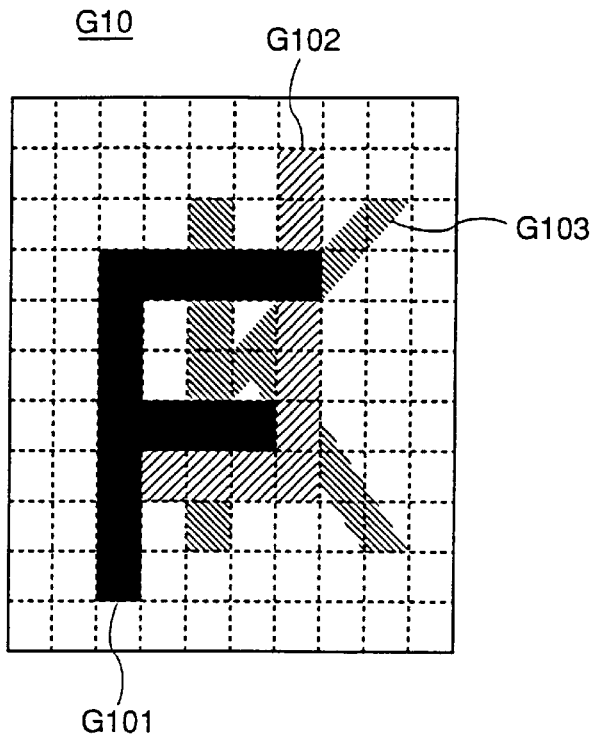
Fig.13A
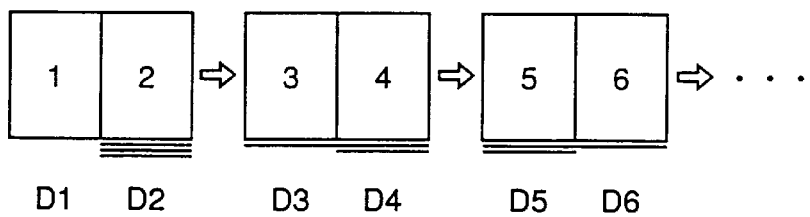
Fig.13B
D1 = g1
D2 = g2 + ([g3] - b)R + (g4 - b)T
D3 = (g1 - b)T + ([g2] - b)R + g3
D4 = g4 + ([g5] - b)R + (g6 - b)T
D5 = (g3 - b)T + ([g4] - b)R + g5
.
.
.

IMAGE PROCESSING APPARATUS THAT CAN READ OUT IMAGE OF ORIGINAL WITH FIDELITY

BACKGROUND OF THE INVENTION

1. Field of the Invention

The present invention relates to an image processing apparatus that can read out an original that is bound together such as a book or magazine, and more particularly, to an image processing apparatus that can read out an image of an original with fidelity.

2. Description of the Related Art

An image reading apparatus called a book scanner is commercialized. This apparatus has an image sensing system disposed above an original platen with an open space of several ten centimeters in height between the original platen and the image sensing system. To read an original in a bound format such as a book or magazine (referred to as "book original"), the user sets the book original in a spread manner facing upwards on the platen. A lamp providing light to the original is turned on in response to the start key being depressed, whereby a scanning operation on the original plane (the side face to be read out) is initiated. An image read out by scanning is appropriately output to an external device. If the external device is a printer, the read out image is printed out. It is to be noted that the book original includes documents filed together.

A book original generally has an image such as text also on the back side of the spread page. In other words, an image is recorded on both sides of a sheet. When the sheet is very thin, an "opposite side transmittance" phenomenon where an image of the back side is discernible through the surface side occurs. This opposite side transmittance degrades the quality of the read out image significantly.

In the field of copying machines, the technique of reducing the effect of such opposite side transmittance by means of image processing is proposed. In the copy operation of a sheet original on which an image is printed on either side of the sheet (duplex original), a density A read out from the front surface side is compared with a density B read out from the back side for each pixel in the original image. A pixel of density B greater than density A is regarded as an opposite side transmittance pixel, and density A of the opposite side transmittance pixel is replaced with the background density (for example 0).

In reading an original of just one sheet, only the issue of opposite side transmittance is to be taken into consideration. In reading a book original which has a plurality of sheets superimposed in a spread manner, there is a possibility that, not only an image of the back side of the spread out page, but also an image of an underlying page is perceptible from the surface of the spread out page. The same can be said in the case where there are a plurality of leaves of documents bound by a stapler and the like.

In the above-described conventional method of image processing, data correction is carried out for each pixel in the read out original on the basis of only one of two choices, i.e. maintain density A, or replace the pixel of interest with background density. The degree of opposite side transmittance depending on the material of the sheet is not reflected in data correction. Therefore, there was a problem that an image read out with fidelity of the original image cannot be obtained when there is a half tone image in both the front and back sides of the sheet with the half tone images of each side overlying each other.

SUMMARY OF THE INVENTION

In view of the foregoing, an object of the present invention is to allow image read out of an original with fidelity in an image processing apparatus that handles an original including a plurality of overlapping sheets.

Another object of the present invention is to allow image read out of an original with fidelity in an image processing apparatus that handles a book type original.

A further object of the present invention is to provide an image processing apparatus that can have perceptible transmittance of an original from a back side and the like deleted in an image processing apparatus that handles an original including a plurality of overlapping sheet faces.

According to an aspect of the present invention, an image reader apparatus for reading an original having a plurality of overlapping sheet faces includes an original platen for mounting an original, a scanner for reading an original image placed on the original platen, a memory for storing image data of the first page and image data of an underlying second page read out by the scanner, and a delete unit for deleting a portion corresponding to the image data of the second page in the image data of the front side of the first page stored in the memory according to the image data of the front side of the second page stored in the memory.

Image data of the front side of the original of the first page and the underlying second page are read out by the scanner and stored in the memory. According to the image data of the front side of the second page stored in the memory, a portion corresponding to the image data of the front side of the second page in the image data of the front side of the first page is deleted. The image data of the front side of the second page can be deleted from the image data of the first page in which the image of the front side of the second page is perceptible, so that only the required image data of the front side of the first page can be extracted. Thus, image read out of an original with fidelity is allowed in an image processing apparatus that handles an original including a plurality of overlapping sheet faces.

According to another aspect of the present invention, a method of reading an original in a state where a plurality of sheet faces are overlapping includes steps set forth in the following. An opposite side transmittance rate representing the degree of transmittance of an image of a second face to a first face which is the sheet face of interest for reading, and a trace transmittance rate representing the degree of transmittance of an image of a third face which is the sheet face located facing the second side on the first face are calculated according to the read out image data obtained by respectively scanning a first sheet face, a second sheet face which is the back side of the first sheet face, and a third sheet face which is said third face when the first sheet face is the first face. Unrequired image component of a read out image data with an arbitrary sheet face as the first face is quantitated using the calculated values of the opposite side transmittance rate and the trace transmittance rate. The quantitative unrequired image component is subtracted from the read out image data.

Unrequired image data of the second and third faces will be transmitted through to be perceptible on the first face including the required image data. By subtracting the image data of the second and third faces from the entire image data of the first face, only the required image data of the first face can be extracted.

An original of a state where a plurality of sheet faces overlap includes a book original (also folded books), leaves of documents (paper slips) and the like. This type of original is generally formed of a plurality of sheets of the same material and thickness. The translucency is substantially identical if the material and thickness are identical. Therefore, opposite side transmittance rate R and trace transmittance rate T have to be obtained only once even in the case where an image of a plurality of sheet faces is sequentially read out one face at a time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 shows a read out image corresponding to FIGS. 11A and 11B.

FIGS. 13A and 13B show the relationship between a page of a book original and image data.

DESCRIPTION OF THE PREFERRED EMBODIMENTS

Embodiments of the present invention will be described hereinafter with reference to the drawings. First, a method of calculating opposite side transmittance rate R and trace transmittance rate T will be described. In the embodiment, reading out a book original is envisaged.

Figure 1A:
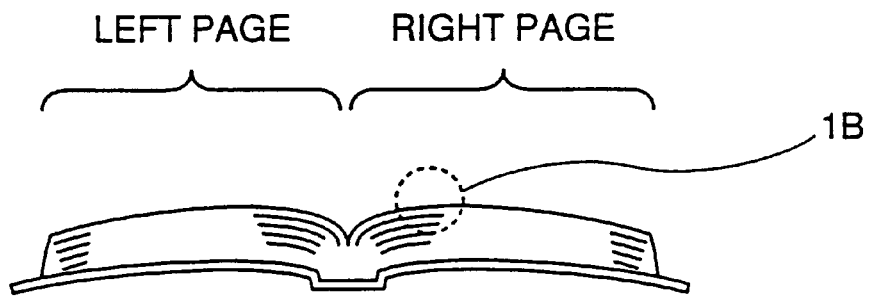
FIG. 1A is a schematic diagram of a book original in a spread manner.
Figure 1B:
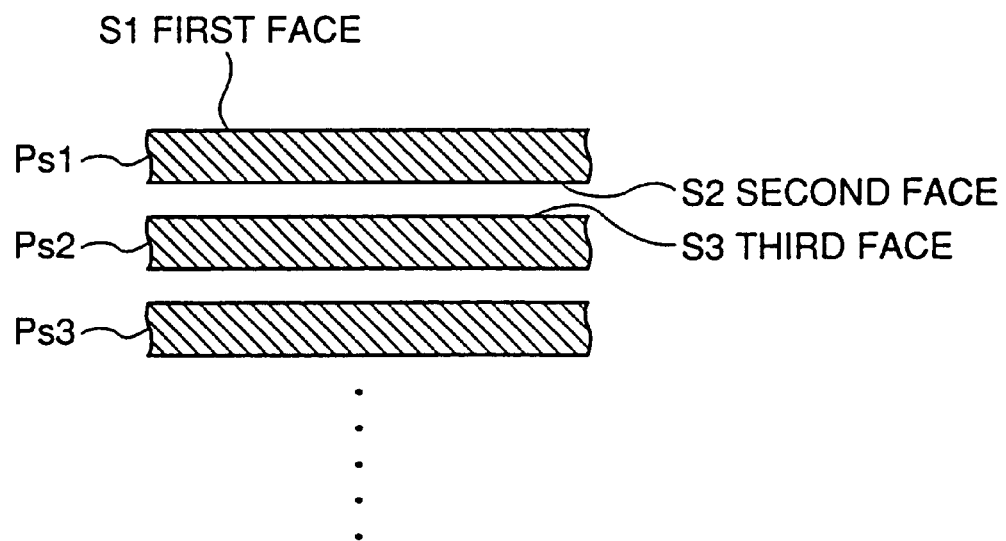
FIG. 1B is a partial enlarged view of a portion indicated by 1B in FIG. 1A.

Referring to FIGS. 1A and 1B, a book original BD includes a plurality of sheets ps1–ps3. In the state shown in FIG. 1B, sheets ps1–ps3 are stacked up vertically. The upper side face (front side) S1 of the topmost sheet ps1 is the right page of the spread original. When face S1 is the face to be read out, face S1 is referred to as the "first face", the bottom face (back side) S2 of sheet ps1 is referred to as the "second face", and the upper face S3 of the second sheet ps2 is referred to as the "third face".

When the page is turned so that face S2 is the read out face of interest, face S2 is "the first face", and face S is "the second face". In this case, "the third face", is the upper face of the second sheet at the left side page of the spread page.

When viewing down on the first face, there is a case where the images of the second and third faces are faintly observable through sheet ps1. In other words, opposite side transmittance and trace transmittance occur. Strictly, the image of faces beneath the third face (such as the back side of sheet ps2 and the front side of sheet ps3) are slightly distinguishable. However, there is no practical influence thereof.

The density of the white sheet portion of each of sheets ps1–ps3 is referred to as "background density Db", and the density of the printed portion when each of faces S1–S3 is directly viewed is referred to as "image density Dg". Image density Dg is the sum of the density of the print material such as the ink (color material density) Dc and the background density Db (Dg=Dc+Db).

Opposite side transmittance rate R and trace transmittance rate T are respectively defined by the following equations (1) and (2).

$$R = Dc2'/Dc2 \quad (1)$$

Dc2': Color material density of second face on first face (opposite side transmittance density)

Dc2: Measured color material density of second face at directly viewed state $$T = Dc3'/Dc3 \quad (2)$$

Dc3': Color material density of third face on first face (trace transmittance density)

Dc3: Measured color material density of third face at directly viewed state

A "directly viewed state" implies the state where the face of interest is the first face.

Figure 2:
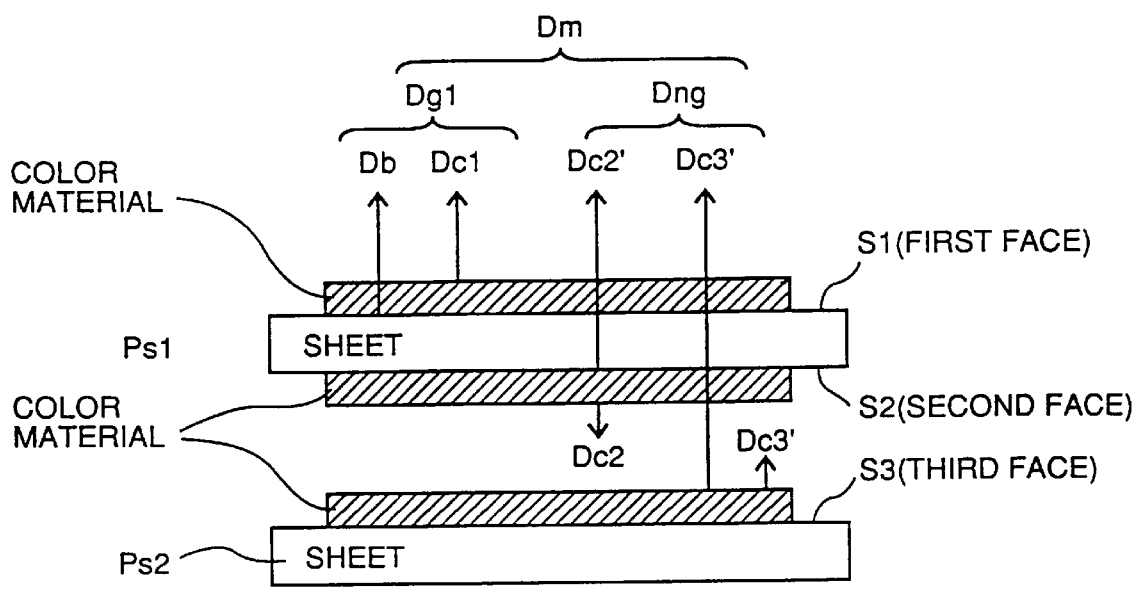
FIG. 2 shows the details of read out density.

Referring to FIG. 2, read out density Dm is the value of opposite side transmittance density Dc2' and trace transmittance density Dc3' added to image density Dg1 of the first face. A transmittance density Dmg which is an addition of opposite side transmittance density Dc2' and trace transmittance density Dc3' is the unrequired image component.

[Extraction of Text Image Region]

The density of a location where there is no half tone image in any of the first, second, and third faces must be measured in properly quantitating transmittance density Dng. Therefore, a region where there is only text image must be extracted in the case where text image (binary image) and a half tone image are mixed.

Figure 3:
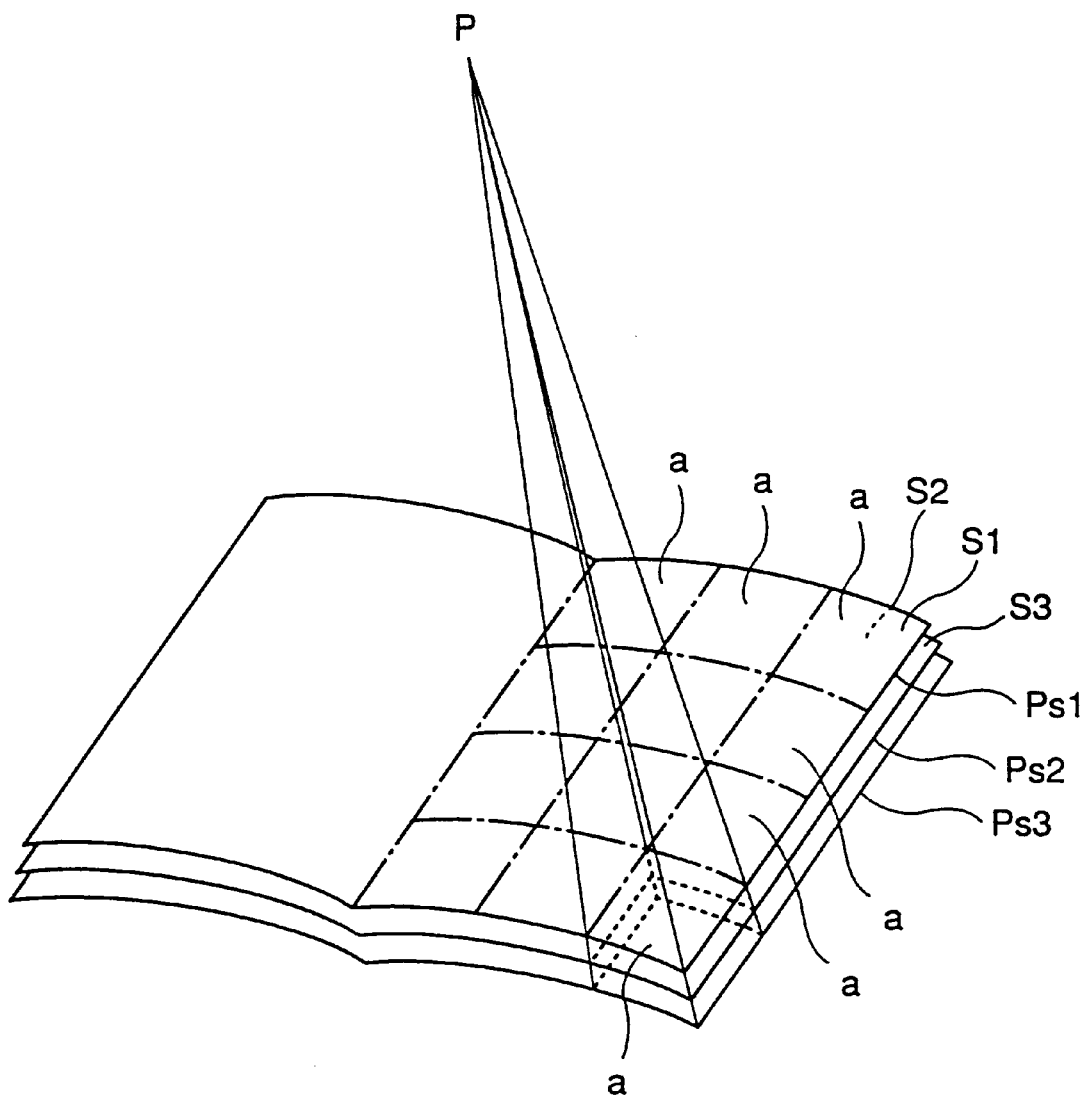
FIG. 3 shows an example of region subdivision.

FIG. 3 shows an example of region subdivision. The type of an image can be determined by detecting the density distribution. More specifically, the number of pixels is counted for every luminance level to identify an obtained luminance histogram. The first face is divided into a plurality of regions a. A luminance histogram is produced for respective faces S1–S3 for each region a. With face S1 as the first face, a region a located at the same position when viewed from an image sensing position P and which has images of faces S1–S3 all completely of text image is extracted.

Figure 4A:
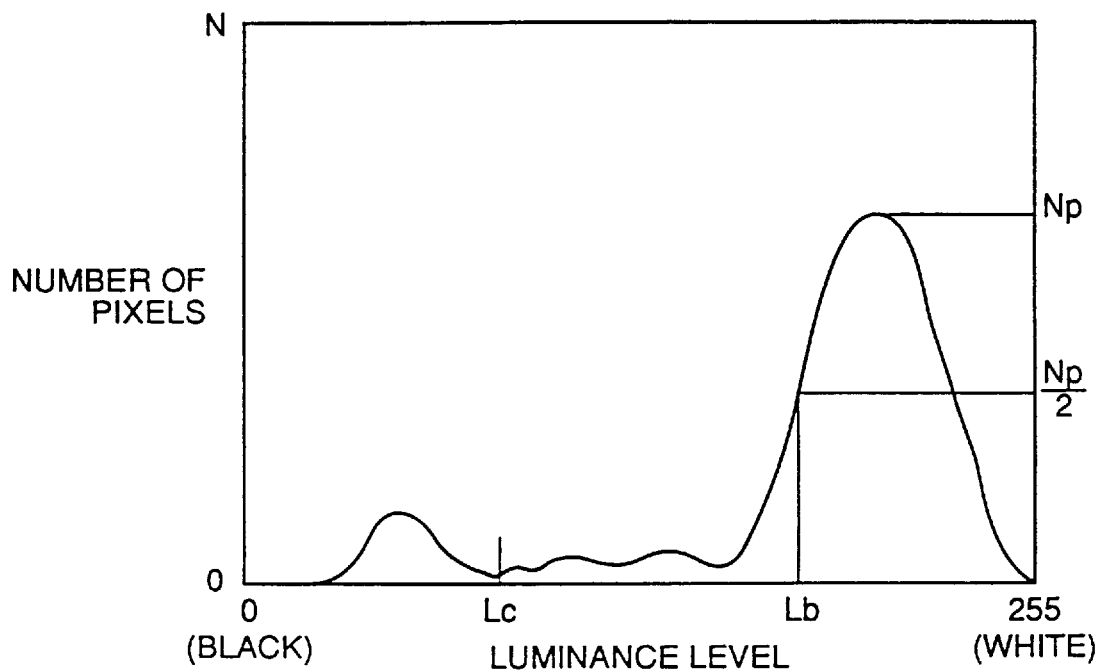
FIGS. 4A and 4B show typical luminance histograms.
Figure 4B:
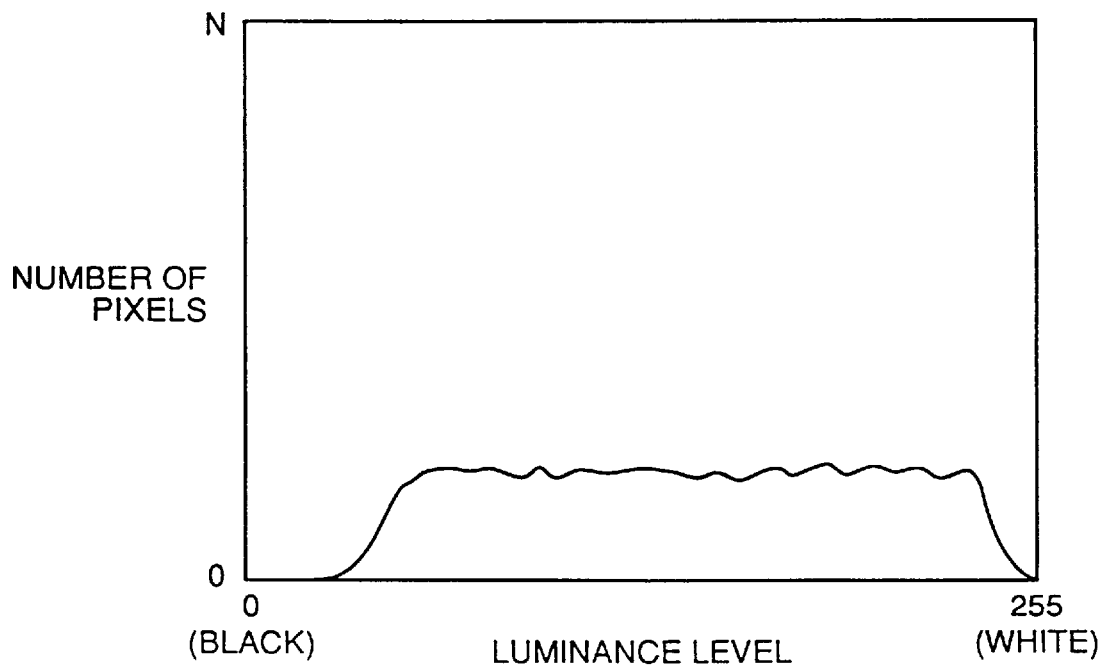

FIGS. 4A and 4B show typical examples of luminance histograms.

When the original image is a text image, the major part of the original image corresponds to the background portion (background of text). Therefore, a great peak appears at the higher luminance group of the luminance range divided into two groups, as shown by the solid line in FIG. 4A. Also, a small peak corresponding to text is identified at the lower luminance group. When the original image corresponds to a half tone image typical of a picture, the number of pixels of each luminance level is substantially equal as shown in FIG. 4B.

The determination procedure is set forth in the following. (1) The peak at the higher luminance group of the luminance range is detected. (2) Background luminance Lb is selected by a predetermined procedure. For example, the lower value of the two luminance level values with the number of pixels half the peak value Np is set as background luminance Lb. (3) Background luminance Lb minus a constant value is set as text luminance Lc. (4) A region a where the total number of pixels is less than a reference value, and between text luminance Lc and background luminance Lb, is determined as a text image region.

In order to improve the calculated accuracy of opposite side transmittance rate R and trace transmittance rate T, it is desirable to extract a plurality of text image regions and use the average value of the read out density for calculation. Arrangement is made so that the spread page is modified when there is no text image region.

[Relationship Between Presence of Image and Density]

When there is no half tone image, the relationship of the three faces S1–S3 is classified into the 8 groups of A–H shown in Table 1 with respect to presence/absence of an image. In Table 1, "⊙" indicates "text present", and "X" indicates "no text". By subdividing each of faces S1–S3 into a plurality of blocks b (refer to FIGS. 11A and 11B), each block corresponds to any of the groups of A–H. The size of block B is preferably substantially equal to the line width of a text. More specifically, when the line width of a character text is 300–600 $\mu$m and the pixel pitch is approximately 64 $\mu$m (400 dpi), a pixel matrix of 5×5~10×10 is set as 1 block.

TABLE 1

| | Presence of image of each face | | |
|---|---|---|---|
| | S1 | S2 | S3 |
| A | ⊙ | ⊙ | ⊙ |
| B | ⊙ | ⊙ | x |
| C | ⊙ | x | ⊙ |
| D | ⊙ | x | x |
| E | x | ⊙ | ⊙ |
| F | x | ⊙ | x |
| G | x | x | ⊙ |
| H | x | x | x |

By applying the specific values of the following Table 2 for background density Db, image density Dg, opposite side transmittance rate R, and trace transmittance rate T, for example, the read out density Dm with each of faces S1–S3 as the first face is as shown at the right column in the following Table 3. It is to be noted that read out density Dm does not exceed image density Dg(=1.6).

TABLE 2

| Background density Db | 0.1 |
|---|---|
| Image density Dg | 1.6 |
| Opposite side transmittance rate R | 1/3 |
| Trace transmittance rate T | 1/5 |

TABLE 3

| | Presence of image of each face | | | Read out density of each faces | | |
|---|---|---|---|---|---|---|
| | S1 | S2 | S3 | Dm1(S1) | Dm2(S2) | Dm3(S3) |
| A | ⊙ | ⊙ | ⊙ | 1.6 | 1.6 | 1.6 |
| B | ⊙ | ⊙ | X | 1.6 | 1.6 | 0.1~0.9 |

TABLE 3-continued

| | Presence of image of each face | | | Read out density of each faces | | |
|---|---|---|---|---|---|---|
| | S1 | S2 | S3 | Dm1(S1) | Dm2(S2) | Dm3(S3) |
| C | ⊙ | X | ⊙ | 1.6 | 0.6~0.9 | 1.6 |
| D | ⊙ | X | X | 1.6 | 0.6~0.9 | 0.1~0.9 |
| E | X | ⊙ | ⊙ | 0.9 | 1.6 | 1.6 |
| F | X | ⊙ | X | 0.6 | 1.6 | 0.1~0.9 |
| G | X | X | ⊙ | 0.4 | 0.1~0.4 | 1.6 |
| H | X | X | X | 0.1 | 0.1~0.4 | 0.1~0.9 |

In the case of F in Table 3, read out densities Dm1, Dm2, and Dm3 of faces S1, S2, and S3 satisfy all the three following conditions.

Dm1<threshold value Dx (for example, value is 1.0)
Dm2≧threshold value Dx
Dm3<threshold value Dx In the case of G in Table 3, read out densities Dm1, Dm2, and Dm3 of faces S1, S2 and S3 satisfy all the three following conditions.

Dm1<threshold value Dx (for example, value is 1.0)
Dm2<threshold value Dx
Dm3≧threshold value Dx By setting an appropriate value of threshold value Dx by experiments and the like, a block corresponding to F and G can be extracted to obtain opposite side transmittance rate R and trace transmittance rate T according to read out density Dm of each face.

In the example of Table 3, the opposite side transmittance rate is R=⅓=(0.6−0.1)/(1.6−0.1), and the trace transmittance rate is T=⅕=(0.4−0.1)/(1.6−0.1). The relationship between background density Db and background luminance Lb is expressed by the following equation (3).

$$Db = log(1/Lb) \quad (3)$$

By obtaining opposite side transmittance rate R and trace transmittance rate T, transmittance density Dng can be calculated to obtain image density Dg in the read out density Dm.

An image processing apparatus that carries out the above calculation will be described hereinafter.

Figure 5:
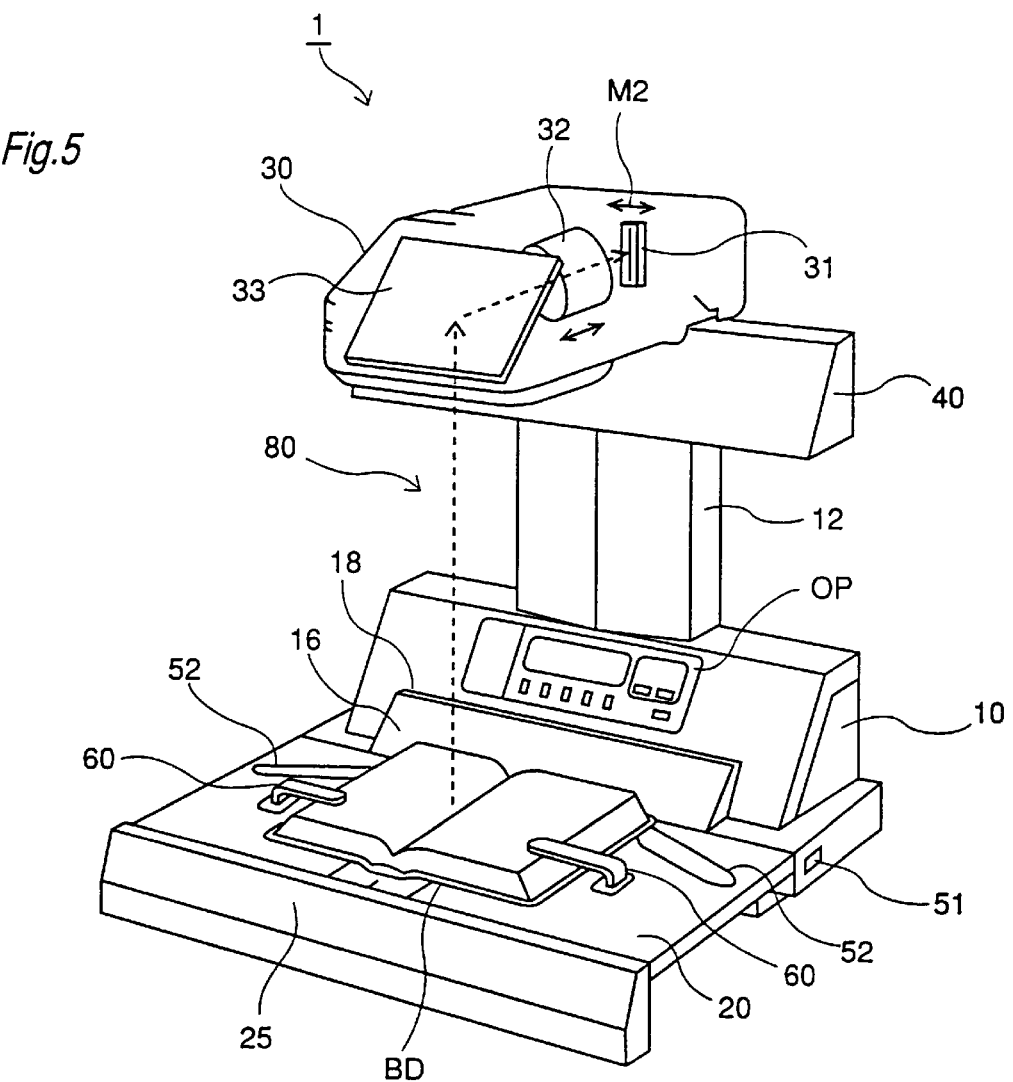
FIG. 5 is a perspective view showing an appearance of a book scanner.

FIG. 5 is a perspective view showing an appearance of a book scanner 1.

Book scanner 1 includes a housing 10 in which electrical circuitry is accommodated, a dark platen 20 for supporting an original, an image sensing unit 30 for converting an original image into electrical signals, and a lamp unit 40 associated with illumination of an original. Platen 20 is arranged at the front side of housing 10. Image sensing unit 30 is disposed above platen 20, and supported in a cantilever manner by a column 12 extending upwards from the top surface of housing 10. Lamp unit 40 is disposed at the bottom side of image sensing unit 30, and fixed by column 12. Space 80 between platen 20 and image sensing unit 30 is open to the free space around the apparatus, and is spacious enough for a book original to be set. The distance between platen 20 and image sensing unit 30 is at least 30 cm.

An operation panel OP is provided at the front upper side of housing 10. A distance measuring plate 16 is fixed at the lower side of housing 10 to detect the height of the top face of the original. The front side surface of distance measuring plate 16 is glossy, and is inclined 45° to the top face of platen 20. The top end face of distance measuring plate 16 functions as a white color board 18 for shading correction. A main switch 51 is provided at the side face of book scanner 1 rightwards when viewed towards operation panel OP.

A start key 52 for the user to indicate initiation of reading is provided at either side in the horizontal direction of platen 20. A pair of page turn detection devices 60 is provided at the center side with respect to each start key 52. An arm rest 25 is provided at the front side of platen 20.

Image sensing unit 30 includes a line sensor 31 of a CCD array, an imaging lens 32, and a mirror 33. The original image is projected on the light receiving plane of line sensor 31 by mirror 33 and imaging lens 32. Imaging lens 32 is provided in a back and forth movable manner. Positioning thereof is defined by an AF mechanism not shown.

Line sensor 31 is attached to a movable body of a scan mechanism not shown to move in parallel along the left and right direction (subscanning direction) M2 with the arrangement of the CCD elements maintained in the vertical direction. Image sensing of an original image in a two dimensional manner is effected by this parallel movement. More specifically, a two-dimensional image sensing plane is formed by the movement of line sensor 31 in book scanner 1. When an area sensor is used instead of line sensor 31, the light receiving plane serves as the image sensing plane. The main scanning direction of the original image is in the back and forth direction on platen 2, and in the vertical direction on the image sensing plane.

Figure 6:
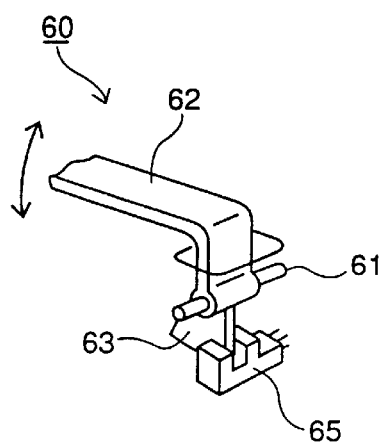
FIG. 6 shows a structure of a page turn detection device.

Referring to FIG. 6, page turn detection device 60 includes an arm 62 that rotates about a shaft 61, a light intercepting plate 63 integral with arm 62, and a photointerrupter 65. Arm 62 holds both sides of book original BD to maintain the spread state. At this stage, light intercepting plate 63 blocks the detection light of photointerrupter 65. When the user turns a page, arm 62 is first rotated so that the leading edge moves upwards, whereby the light intercepting state of light intercepting plate 63 is canceled. When arm 62 is rotated in an opposite direction to return to the state of holding the spread page, light intercepting plate 63 will block the detection light again.

Figure 7A:
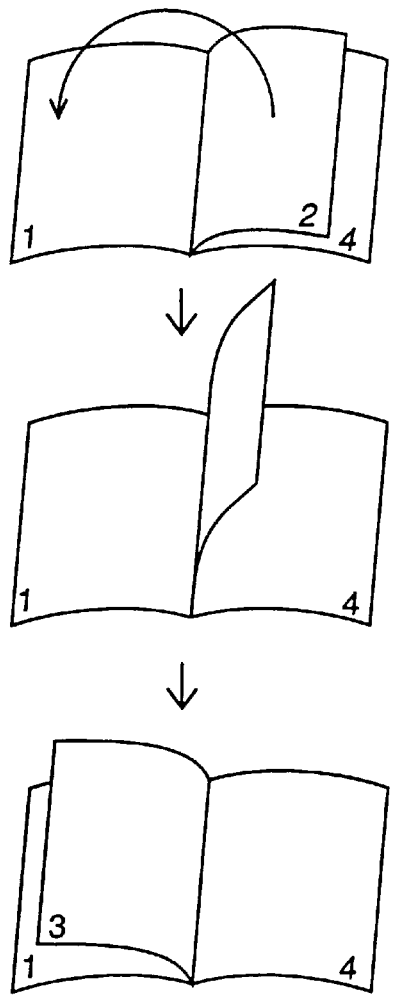
FIGS. 7A and 7B are schematic diagrams of turning pages.
Figure 7B:
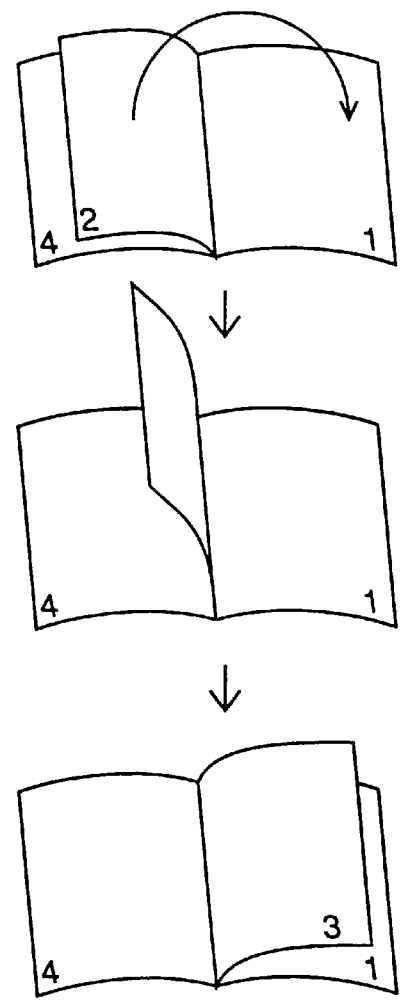

Determination can be made whether book original BD is bound in western style or in Japanese style by detecting the cancel sequence of the light intercepting state by the left and right page turn detection devices 60 (refer to FIGS. 7A and 7B). Assuming that read out is carried out in the order of the page number, "leftward advance" where the sheet is turned from the right to the left is executed when the light intercepting state of the right side page turn detection device 60 is canceled earlier than the left side page turn detection device 60. Therefore, book original BD is bound in western style. In an opposite state, "rightward advance" where the sheet is turned from the left to the right is effected. Therefore, book original BD is bound in Japanese style.

Book scanner 1 of the above-described structure is an image input apparatus suitable for reading a book original. By combining book scanner 1 and a digital copying apparatus, an integrated copying system applicable for various types of originals can be implemented.

In using book scanner 1, the user sets book original BD facing upwards in a spread state on platen 20 as shown in FIG. 5. Book original BD is urged against the lower end of distance measuring plate 16 for positioning. In other words, the boundary between distance measuring plate 16 and platen 20 is the reference line of setting the original. The center of the reference line is the reference position. Platen 20 can be moved vertically independent of the horizontal direction. Therefore, the height of the spread left and right pages can be arranged to be substantially equal.

According to book scanner 1, two scanning operations (read out of original image) is carried out for the same original. Book original BD has a curved original face differing from the flat face of a sheet original. Focus of the image sensing system must be adjusted according to the curving state of the original face. Also, a process for compensating for a difference in luminance must be carried out. At the first scanning operation (referred to as "preliminary scanning" hereinafter), the curved state is detected. At the second scanning operation (referred to as "main scanning" hereinafter), required processing is carried out according to the detected result of the first scanning operation. Image output towards an external device is effected during the main scanning operation. The shifted direction of line sensor 31 during main scanning is opposite to that of preliminary scanning. The read out mode includes the mode of reading both left and right pages at one time (a scanning fashion similar to that of a sheet original), and the mode reading the left and right pages individually. Preliminary scanning and main scanning are carried out for each page in either mode.

Figure 8A:
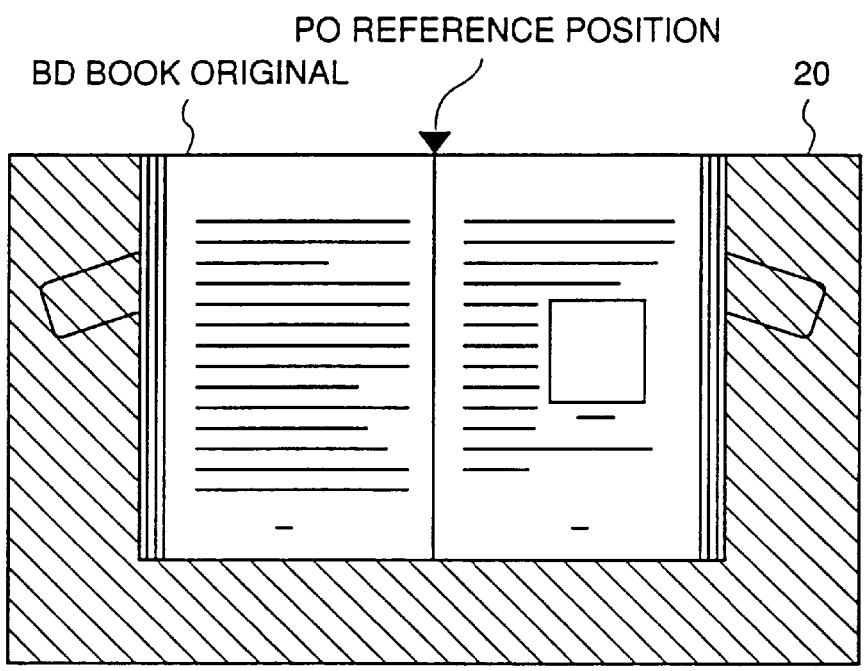
FIGS. 8A and 8B are plan views of an example of reading out a book original.
Figure 8B:
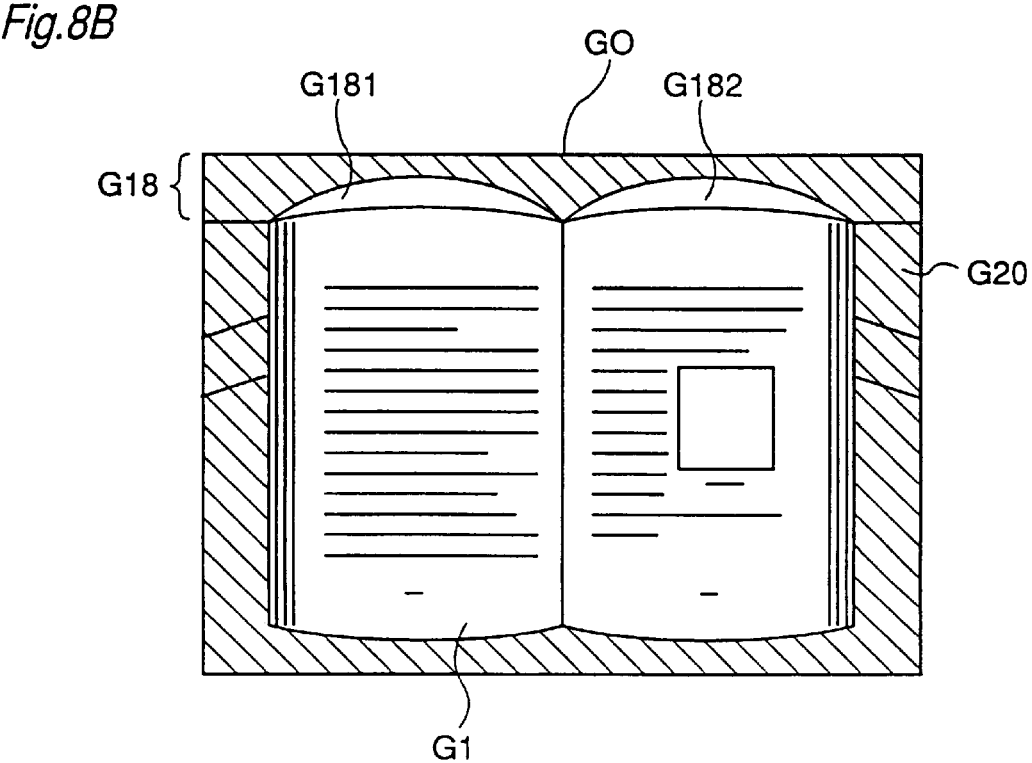

FIG. 8A shows the manner of book original BD set on platen 20, and FIG. 8B indicates the read out image G0.

Read out image G0 includes an image G1 of the original face of book original BD, an image G20 corresponding to platen 20, and an image G18 projected on distance measuring plate 18. Images G181 and G182 in image G18 shows the edge faces of a spread book original BD (the portion called "top edge" in a book). The portion of image G18 excluding images G181 and G182 corresponds to the background image projected on distance measuring plate 18. Since the boundary between images G18 and G20 corresponds to the aforementioned reference line and is already known, the height of the top face of the original can be calculated from the distance (number of pixels) between the boundary and the contour line of images G181 and G182. The boundary between image G1 and G20 can readily be detected taking advantage of difference in color between the background color of the original face and the color of platen 20. The edge of book original BD on the image sensing plane can be identified if the boundary between images G1 and G20 is determined.

The upper edge and the lower edge of image G1 are curved because the height of the original face is not constant. In other words, an object closer to the image sensing plane is image-sensed bigger than a farther object. In the main scanning operation, an image process for correcting curved image G1 as an image where the height of the original plane is constant (image distortion correction) is carried out according to the height information of the original face obtained in preliminary scanning.

Figure 9:
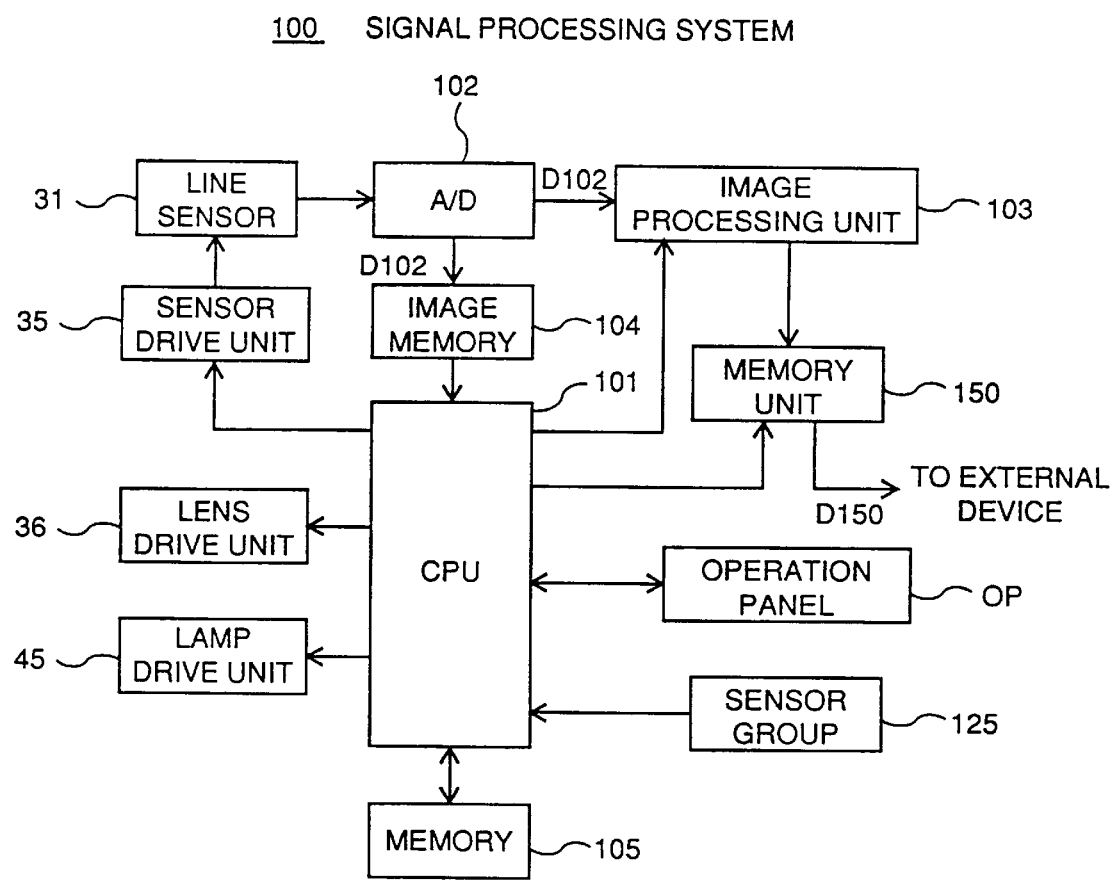
FIG. 9 is a block diagram of a signal processing system of a book scanner.

FIG. 9 is a block diagram of a signal processing system 100 of book scanner 1.

The output of line sensor 31 is converted into image data D102 of 8 bits, for example, by an AD converter 102.

In the preliminary scanning operation, image data D102 is first stored in an image memory 104, and then entered into a CPU 101. CPU 101 calculates the height of the original face at each position which is a subdivision of the subscanning range at equal interval according to image data D102 to generate data used for image distortion correction and density correction to prepare for the main scanning operation.

In the main scanning operation, image data D102 is sent from AD converter 102 to an image processing unit 103. Image processing unit 103 carries out various processes such as converting luminance data into density data, correcting image distortion caused by a curve in the original face, density correction, and masking for eliminating the image of the user's hand that is holding the original. Image data D103 subjected to a predetermined image process is transferred to a memory unit 150. Memory unit 150 includes a memory for storing a plurality of pages of image data D103.

CPU 101 reads out image data D103 of a predetermined page from memory unit 150 to calculate opposite side transmittance rate R and trace transmittance rate T. The value of image data D103 of each page is amended to a value subtracting the transmittance density from that value. The corrected image data D150 is appropriately output to an external device such as a copying machine or a printer.

CPU 101 controls the driving system including a sensor drive unit 35, a lens drive unit 36, and a lamp drive unit 45. Sensor drive unit 35 supplies a predetermined clock signal to line sensor 31 to drive the scanner. Lens drive unit 36 adjusts the position of imaging lens 32 according to an AF signal from CPU 101. A signal from a sensor group 125 including page turn detection device 60 is applied to CPU 101.

Figure 10:
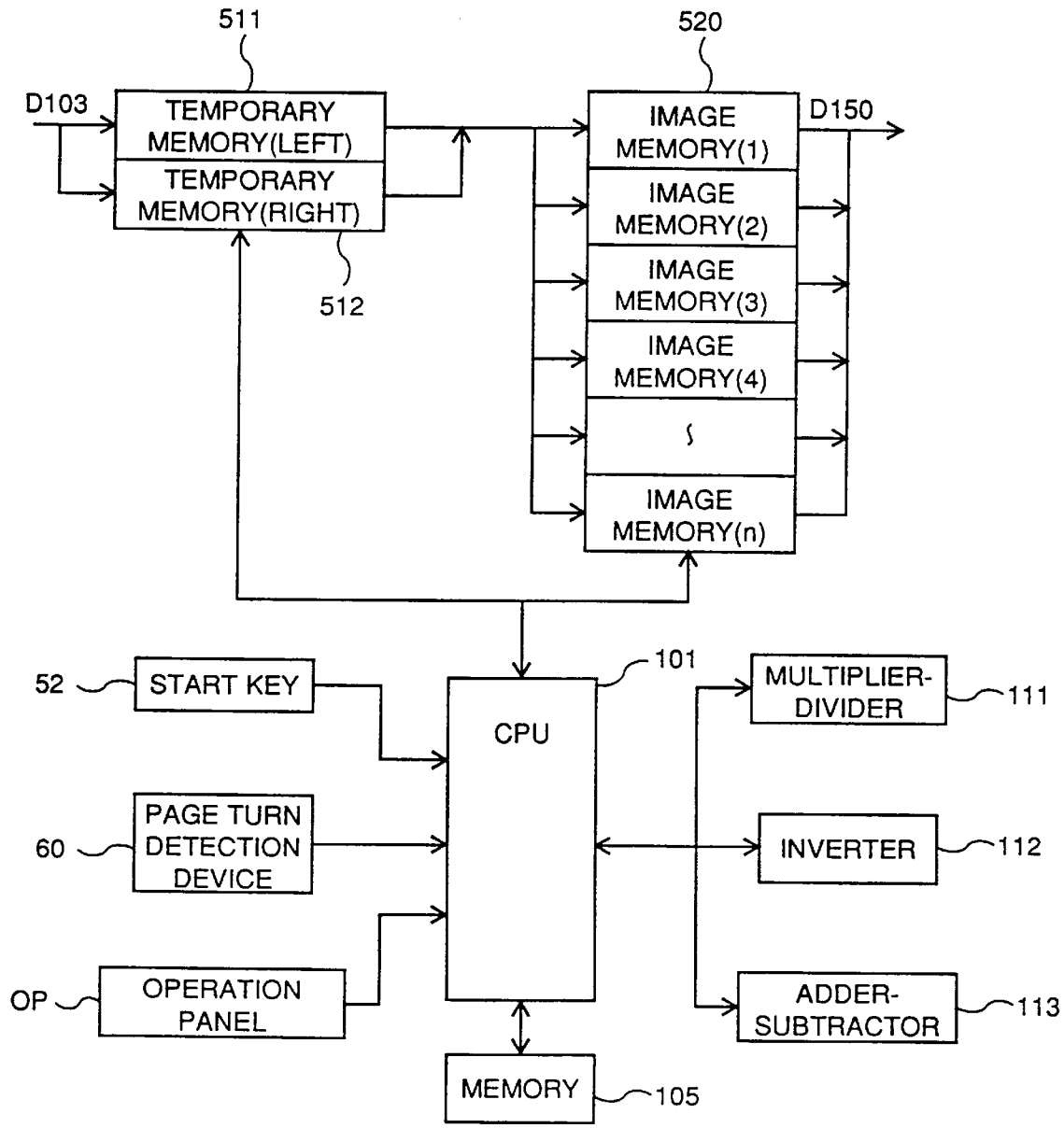
FIG. 10 is a block diagram of a memory unit.

FIG. 10 a block diagram of memory unit 150. Memory unit 150 is provided to arrange a read out image G0 in the order of the page number in reading out a plurality of pages. The basic data flow of memory unit 150 is set forth in the following.

Image data of an original face extracted from the image-sensed information, i.e. image data D103 corresponding to image G1 (refer to FIGS. 8A and 8B) is applied to memory unit 150 from image processing unit 103. Image data 103 is data having image distortion caused by the curved original face corrected.

In the read out mode where spread left and right pages are read out individually, image data D103 of one page (left page) read out in response to start key 52 located at the left side with respect to operation panel OP is temporarily stored in a first temporary memory 511. Image data D103 of one page (right page) read out in response to the right side start key 52 being turned on is temporarily stored in a second temporary memory 512. When the page is turned in the leftward advance manner (refer to FIG. 7A), image data D103 is read out first from first memory 511 and from second memory 512 to be stored in image memory 520. Conversely, when the page is turned in a rightward advance manner, image data D103 is read out first from second temporary memory 512 and then from first temporary memory 511 to be stored in image memory 520. Image data D103 of each page can be arranged in the order of the page number by switching the read out order from temporary memories 511 and 512 according to the advance direction of turning the page and storing image data D103 into image memory 520 in the read out order.

In correcting data for deleting an unrequired image, CPU 101 reads out image data D103 of a required page from image memory 520. Predetermined calculation is carried out using a multiplier-divider 111, an inverter 112, and an adder-subtractor 113.

A method of correcting read out image in book scanner 1 will be described hereinafter.

Figure 11A:
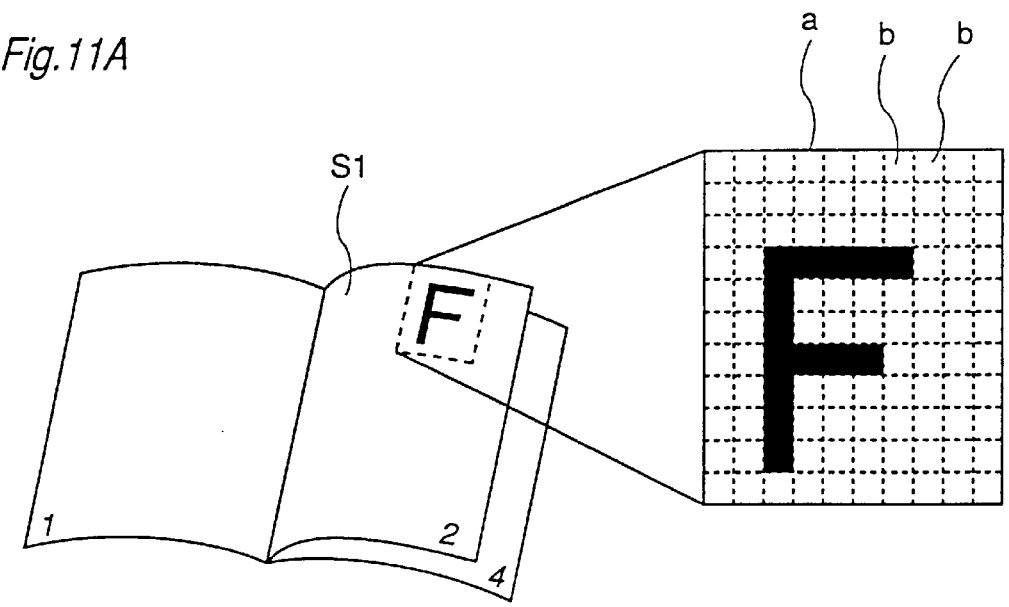
FIGS. 11A and 11B show examples of an original image.
Figure 11B:
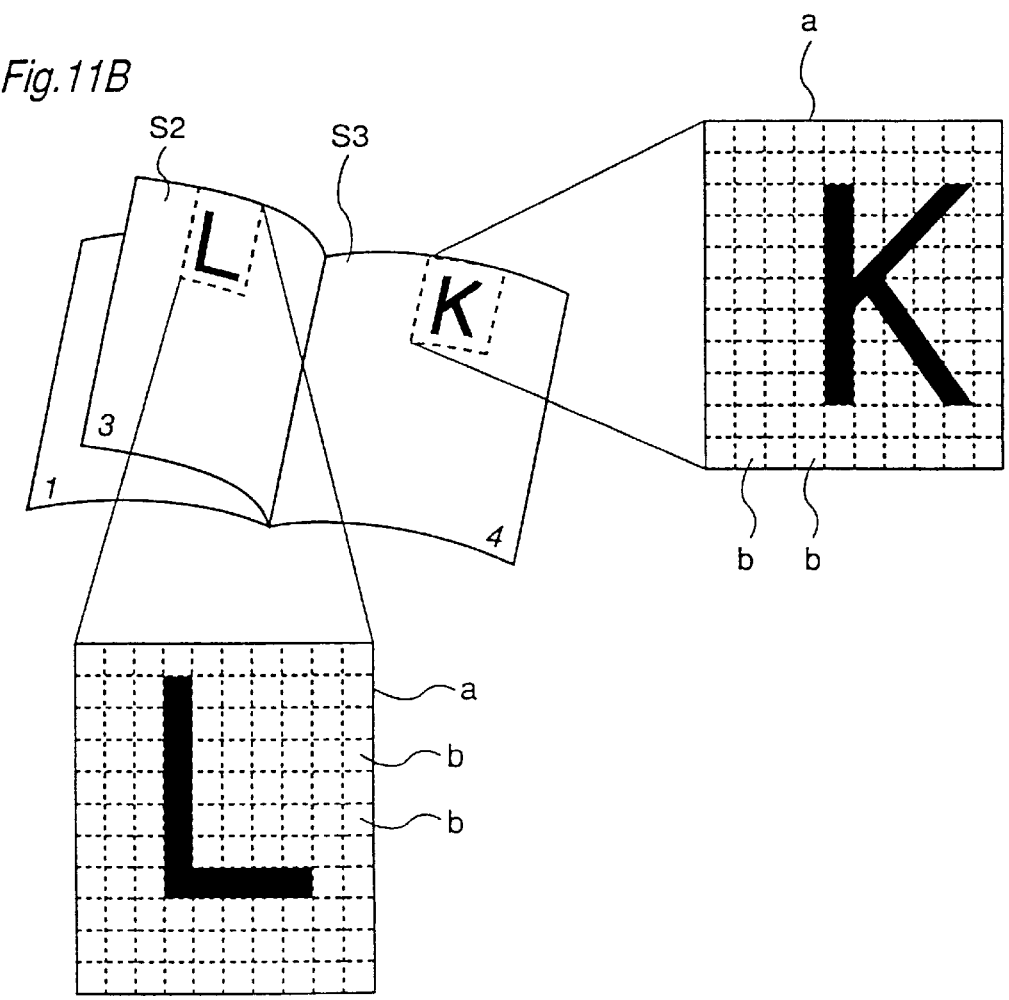

FIGS. 11A and 11B show examples of an original image, and FIG. 12 shows a read out image G10 corresponding to FIGS. 11A and 11B.

In the examples of FIGS. 11A and 11B, book original BD is bound in western style. Character "F" is printed on sheet face S1 of page number 2 which is the right page of the spread original, character "L" is printed on sheet face S2 of page number 3 which is the back side of sheet face S1, and character "K" is printed on sheet face S3 of page number 4.

In this case, read out image G10 of sheet face S1 is a superimposition of image G101 corresponding to character "F", image G102 which is a laterally-inverted version of character "L" (referred to as "inverted image"), and image G103 corresponding to character "K".

Inverted image G102 and image G103 are transmittance images that are not required. Book scanner 1 carries out a process to delete inverted image G102 and image G103 from readout image G10.

FIGS. 13A and 13B show the relationship between the page number of book original BD and image data. It is assumed that a serial page number i is assigned to each page of book original BD.

In the case of book original BD bound in western style, read out image data D1 of the spread left side page is expressed by the following equation (4), and read out image data $D_i$ of the right side page is expressed by equation (5).

$$D_i = (g_{i-2}-b) \times T + ([g_{i-1}]-b) \times R + g_i \qquad (4)$$

$$D_i = g_i + ([g_{i+1}]-b) \times R + (g_{i+2}-b) \times T \qquad (5)$$

$g_i$: pixel value of image of page i
$[g_i]$: pixel value of inverted image version of the image of page i
b: background density component
R: Opposite side transmittance rate
T: Trace transmittance rate An inverted image can be obtained by reading out an image in the memory in a direction opposite to that of storage in the left and right direction. Assuming that pixel positioning is carried out for the read out images of the front side and the back side of one sheet, equations (4) and (5) can be replaced by the following equations (4') and (5'), respectively.

$$D_i = (g_{i-2}-b) \times T + (g_{i-1}-b) \times R + g_i \qquad (4')$$

$$D_i = g_i + (g_{i+1}-b) \times R + (g_{i+2}-b) \times T \qquad (5')$$

Opposite side transmittance rate R and trace transmittance rate T can be obtained as described above according to read out image data $D_i$ of three pages in series in page number i. Background density component b is specified during this procedure. By establishing and solving simultaneous equations as to read out image data $D_i$ of a plurality of pages using equations (4') and (5'), pixel value $g_i$ which is an unknown numeral can be calculated. As to a page not read out, pixel value g is set as empty data (0) for the sake of convenience.

Calculated pixel value gi corresponds to read out image data $D_i$ minus the unrequited image component. Pixel value $g_i$ is to be output to the external device instead of read out image data $D_i$.

Figure 14:
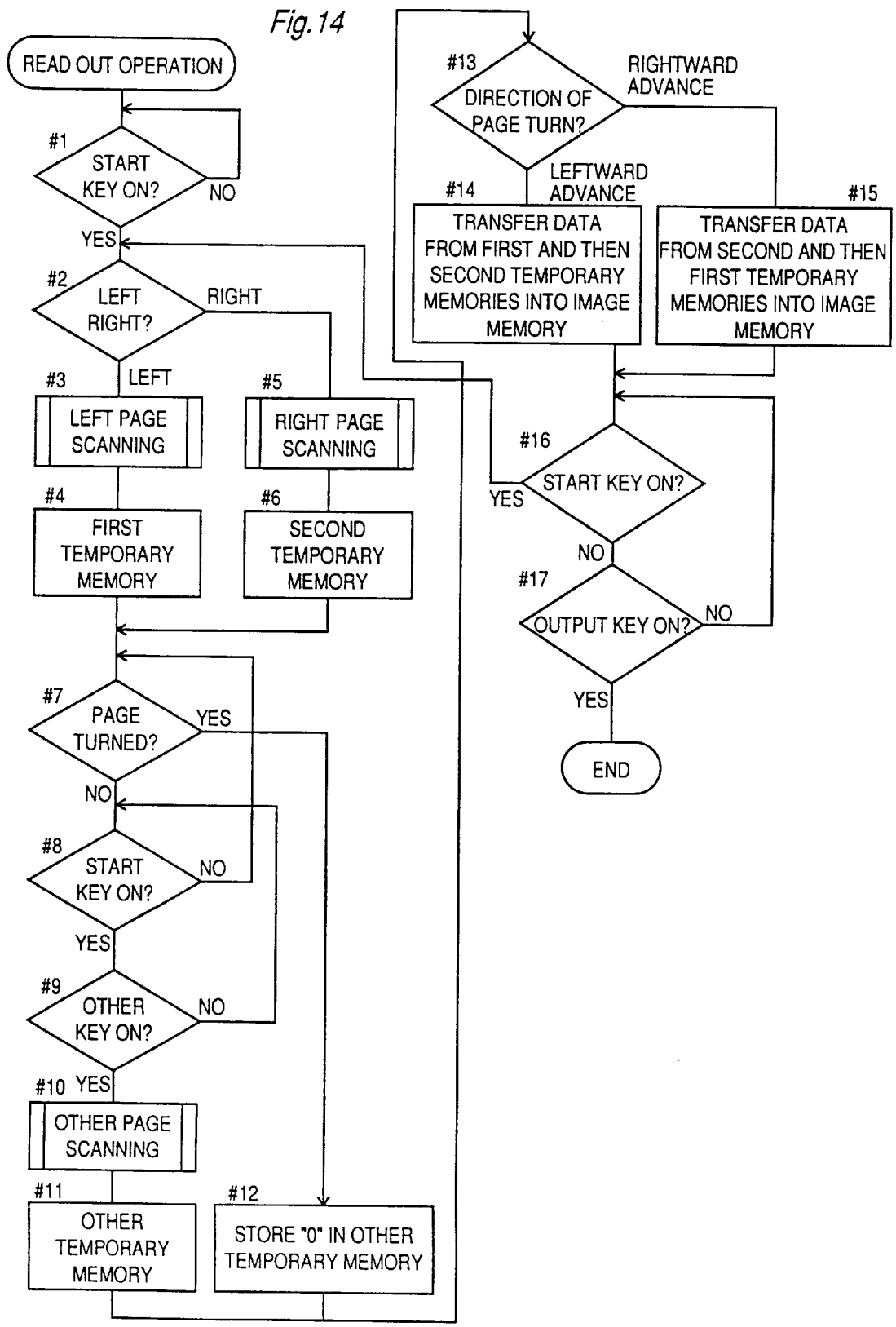
FIG. 14 is a flow chart of a read out operation.

FIG. 14 is a flow chart of a read out operation.

Preliminary scanning and main scanning are carried out in response to start key 52 being turned on. When the left start key 52 on platen 20 is turned on, a scanning process of the left page is executed. In the main scanning operation, image data D103 is stored in first temporary memory 511 (#1–#4). When the right start key 52 is turned on, a scanning process of the right page is executed. Image data D103 is stored in second temporary memory 512 (#5 and #6).

When the page is turned at the stage where only either of the spread pages is read out, empty data is stored in the temporary memory corresponding to the page not read out (#7, #12). When the page is not turned over and a start key 52 is turned on which is opposite to the previously turned on key, the unread page is scanned, and image data D103 is stored in the temporary memory differing from the previous temporary memory (#8–#11). When a start key 52 of the side identical to the previous key is turned on, scanning is not carried out, and the count of turn-on is stored. In this case, image data D150 of the same page is repeatedly output to the external device for a number of times corresponding to the number of turned-on times.

When the page is then turned over, the advance direction of the page turn is determined according to the order of the signal output of the two page turn detection devices 60 (#13). In the case of leftward advance, data is transferred first from first temporary memory 511 and then from second temporary memory 512 to image memory 520 (#14). In the case of rightward advance, data is transferred first from second temporary memory 512 and then from first temporary memory 511 to image memory 520 (#15).

When start key 52 is turned on again, the currently spread page is scanned (#16, #2). When an output key not shown on operation panel OP is turned on, the read out operation ends (#17).

CPU 101 carries out a data output process succeeding control of the read out operation. In the data output process, CPU 101 reads out image data of a predetermined page from image memory 520 to calculated opposite side transmittance rate R and trace transmittance rate T. A data process for deleting unrequired image from the read out image is carried out. The read out image subjected to this data correction process is provided to an external device.

Figure 15:
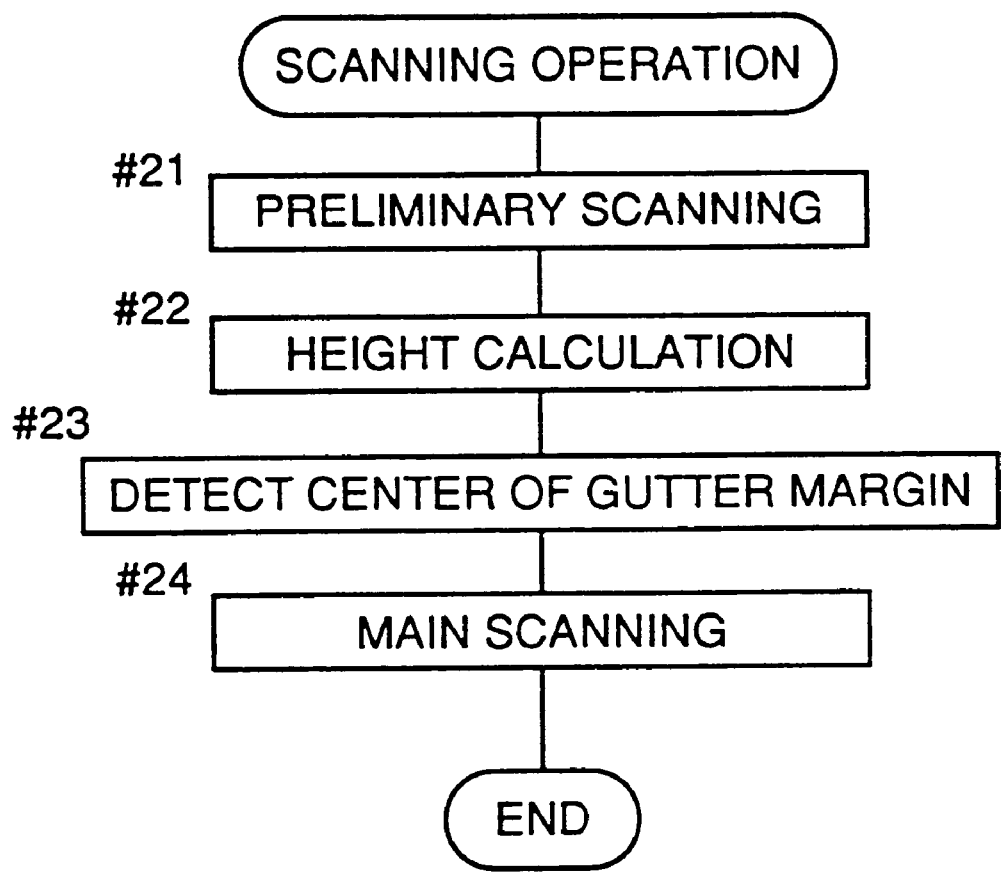
FIG. 15 is a flow chart of a scanning operation.

FIG. 15 is a flow chart of a scanning operation.

Change in the height of the original face in the subscanning direction is detected by analyzing the image-sensed information obtained in the preliminary scanning operation (#21, #22). According to the height information, the center in the horizontal direction of the gutter margin in book original BD, i.e. the boundary of the spread out left and right pages, is detected (#23). This is carried out to improve the pixel positioning accuracy with respect to the read out images of the front and back sides. The position where the inclination direction of the original face is inverted in the gutter margin is the center. In the main scanning operation, a process for generating an inverted image with the center of the gutter margin as the reference is carried out together with the image distortion correction process (#24).

Although the above embodiment is described taking a book original having the image data on both sides of an original as an example, the present invention is applicable to the case where there is image data at only the front face of an original. In this case, the opposite side transmittance rate is R=0 in the above embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus reading out an original in a state where a plurality of sheet faces are superimposed, said image reading apparatus comprising:
   a platen on which an original is mounted;
   a scanner for reading an original image placed on said platen;
   a memory for storing image data of a front side of a first sheet read out by said scanner at a first memory position and image data of a front side of a second sheet read out by said scanner at a second memory position, different from the first memory position; and
   deleting means for deleting a portion corresponding to image data of the front side of said second sheet from image data of the front side of said first sheet stored in said first memory position of said memory according to the image data of the front side of said second sheet stored in said second memory position of said memory.

2. The image reading apparatus according to claim 1, wherein said deleting means further deletes a portion corresponding to image data of a back side of said first sheet in image data of the front side of the first sheet stored in said first memory position of said memory according to image data of the back side of said first sheet stored in a third memory position of said memory.

3. The image reading apparatus according to claim 1, wherein said original of a state where a plurality of sheet faces are superimposed is a book original.

4. The image reading apparatus according to claim 2, wherein said deleting means deletes image data of the back side of said first sheet after laterally inverting the image data of the back side of the read out first sheet.

5. The image reading apparatus according to claim 1, wherein said scanner is disposed substantially above said platen.

6. An image reading apparatus reading out an original in a state where a plurality of sheet faces are superimposed, said image reading apparatus comprising:
   a platen on which an original is mounted;
   a scanner for reading an original image placed on said platen;
   a memory for storing image data of front sides of a first sheet and second sheet read out by said scanner; and
   deleting means for deleting a portion corresponding to image data of said second page from the image data of the front side of said first sheet stored in said memory according to the image data of the front side of said second sheet stored in said memory, said deleting means including
   trace transmittance rate calculation means for calculating a trace transmittance rate indicating degree of transmittance of the front side of the second sheet on the front side of the first sheet, wherein image data of the front side of the second sheet is deleted from the image data of the front side of the first sheet according to the trace transmittance rate calculated by said trace transmittance rate calculation means.

7. An image reading apparatus reading out an original in a state where a plurality of sheet faces are superimposed, said image reading apparatus comprising:
   a platen on which an original is mounted;
   a scanner for reading an original image placed on said platen;
   a memory for storing image data of a front side and a back side of a first sheet and image data of a front side of a second sheet read out by said scanner; and
   deleting means for deleting,
   a portion corresponding to image data of back side of said first sheet in image data of the front side of the first sheet stored in said memory according to image data of the back side of said first page stored in said memory, and
   a portion corresponding to image data of the front side said second sheet from the image data of the front side of said first sheet stored in said memory according to the image data of the front side of said second page stored in said memory, said deleting means including
- opposite side transmittance rate calculation means for calculating an opposite side transmittance rate indicating degree of opposite side transmittance of the back side of said first sheet on the front side of said first sheet, wherein image data of the back side of the first sheet is deleted from the image data of the front side of the first sheet according to the opposite side transmittance rate calculated by said opposite side transmittance calculation means.

8. A method of correcting a read out image comprising the steps of:

reading out an original of a state where a plurality of sheet faces are superimposed, calculating an opposite side transmittance rate representing degree of image transmittance on a first face which is a sheet face of interest to be read out by an image of a second face which is a back side of said first face, and a trace transmittance rate representing degree of image transmittance on said first face by an image of a third face which is a sheet face located facing said second face according to read out image data obtained by respectively scanning a first sheet face, a second sheet face which is the back side of said first sheet face, and a third sheet face which is said third face when said first sheet face is said first face, and quantitating an unrequired image component in read out image data with an arbitrary sheet face as the first face, and subtracting said quantitative unrequired image component from the read out image data using respective calculated values of said opposite side transmittance rate and trace transmittance rate.

9. An image reading apparatus including a platen for supporting an original of interest for reading, an image sensing means for converting an original image into electrical signals, and a signal processing system for quantitating and providing to an external device said electrical signals, and of a structure where there is an open space between said platen and said image sensing means for setting an original, wherein said signal processing system comprises
- an image memory in which read out image data of a plurality of pages can be stored, and
- in reading out an original of a state where a plurality of sheet faces are superimposed, calculates an opposite side transmittance rate representing degree of image transmittance on a first face which is a sheet face of interest for read out by an image of a second face which is a back side of the first face, and a trace transmittance rate representing degree of image transmittance on said first face by an image of a third face which is a sheet face located facing said second face according to read out image data obtained by respectively scanning a first sheet face, a second sheet face which is the back side of said first sheet face, and a third sheet face which is said third face when the first sheet face is said first face, and

- quantitating an unrequired image component in read out data with an arbitrary sheet face as the first face, and subtracting said quantitative unrequited image component from that read out image data using respective calculated values of said opposite side transmittance rate and trace transmittance rate.

10. An image reading method for reading images which are respectively formed on sheets in a state where the sheets are stacked, said image reading method comprising:

a first reading step of reading a front side of a first sheet to generate first front image data;

a first storing step of storing said first front image data in a memory;

a second reading step of reading a front side of a second sheet, which faces the first sheet while the front side of the first sheet is read in said first reading step, to generate second front image data;

a second storing step of storing said second front image data into a memory; and deleting a portion corresponding to image data of the front side of the second sheet from the first front image data according to the second front image data stored in the memory.

11. The image reading method according to claim 10, further comprising:

a third reading step of reading a back side of the first sheet to generate a first back image data; and a third storing step of storing said first back image data is stored into a memory;

wherein, in said deleting step, a portion corresponding to image data of the back side of the first sheet is also deleted from the first image data according to the second back image data stored in the memory.

* * * * *